INVENTOR.
J. HOWARD BECK
ATTORNEYS

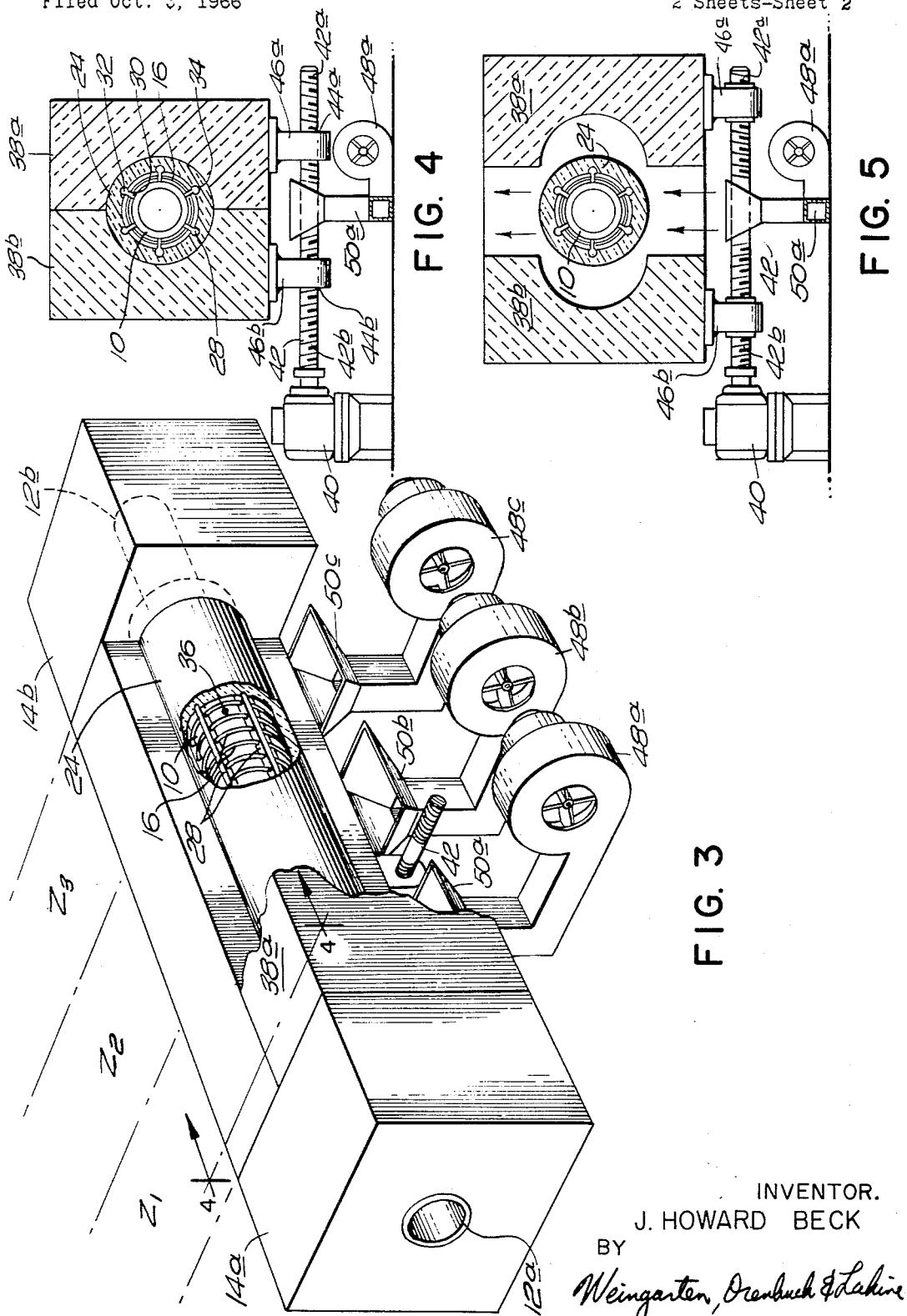

United States Patent Office 3,405,924
Patented Oct. 15, 1968

3,405,924
FURNACE WITH VARIABLE EFFECTIVE
INSULATION
Jacob Howard Beck, Waban, Mass., assignor to BTU
Engineering Corporation, a corporation of Delaware
Filed Oct. 3, 1966, Ser. No. 583,724
9 Claims. (Cl. 263—41)

ABSTRACT OF THE DISCLOSURE

A furnace having the capability of rapidly heating and cooling a product in a precise and efficient manner while avoiding local hot spots in the chamber. These rapid and efficient temperature changes are made possible by adjustment of the effective insulation around the fixed furnace chamber.

This invention relates to furnaces, and more particularly to furnaces that combine close product temperature control with rapid product heating and cooling capability.

In many processes, particularly those useful in the semiconductor industry, it is required that a cold product be rapidly heated to some elevated temperature (usually called the "soak" or "processing" temperature), maintained at the precise soak temperature for a predetermined period of time which may be relatively brief, and rapidly cooled to ambient thereafter. The suitability of a furnace for this type of process depends upon its ability to rapidly heat and cool the product, while maintaining close temperature control.

Conventional means for bringing a product up to soak temperature are well known and quite satisfactory when particularly high speed operation with exact product temperature control is not necessary; as an elementary example, a preheated, well-insulated furnace maintained well above the soak temperature will provide the necessary temperature differential between furnace and product to assure rapid heating. The problem arises when one establishes the requirement of very rapid heating to the predetermined soak temperature without overrunning to a higher temperature, and the corollary requirement of rapid cooling from the soak temperature.

The time required to heat a product to a predetermined temperature is inversely dependent upon the temperature differential between the furnace and the product; the higher the temperature differential, the shorter the time required. Accordingly, in rapid heating processes, instead of the cold product being placed in a furnace maintained at a soak temperature and premitted to gradually heat up to the furnace or soak temperature, the furnace is maintained at a temperature considerably higher than that of the soak temperature, at least throughout a major segment of the heat up period, during which time the product temperature rapidly rises to the soak temperature. However, unless the furnace temperature is rapidly dropped during the terminal stage of the heat up period, there would remain a temperature differential, between the furnace temperature and the product temperature, sufficient to cause the product to overshoot the soak temperature value. Such overheating is entirely unacceptable in numerous processes, as when the product rapidly decomposes or otherwise deteriorates just above the soak temperature, or as when the product must be heated at the soak temperature for only a brief yet exact period of time and then rapidly cooled. Thus, during the terminal stage of the product heat up period in a well controlled rapid heating furnace, an equilibrium condition is desired where the product temperature is rising to soak temperature while the furnace temperature is falling to the same soak temperature. In order for the product not to overheat, the furnace must arrive at soak temperature no later than the time that the product reaches soak temperature and must remain there in stable equilibrium; that is, without the furnace either overcooling or overheating thereafter.

In many applications, a product which has been heated must be rapidly cooled after it has been maintained at the soak temperature for a period of time determined by the prescribed temperature programs. It is often critical that a product, after having been held at an elevated temperature, be cooled not only rapidly, but also evenly across its length to minimize local hot spots and avoid product distortions which might otherwise result from uneven cooling. On the other hand, in other applications, because different products may be spaced longitudinally in a single furnace, it may be desired that the furnace not be uniformly cooled along its length. In such instances, it may be desired that axial temperature differentials be maintained within the furnace in order to provide differential cooling rates for particular products within the furnace or particular areas of a single product within the furnace.

Turning now to a consideration of the conventional mechanisms of furnace heating and cooling, it will be observed initially that the operation of a furnace heater is normally controlled by a power modulator controlled in turn from a temperature sensor. A manual or programmed adjustment of the set point temperature of a controller determines the temperature of the furnace, the controller acting automatically to turn off or reduce the heater power whenever the furnace temperature substantially exceeds either the set point temperature, or a temperature directly related to the set point temperature. The simplest and probably most widely used method of cooling a furnace is to continuously reduce the temperature of the controller set point; this results in the heating being turned off or lowered intermittently, as necessary, so that the furnace cools evenly and under control. According to this method, however, the cooling rate of the furnace is determined by all the structural elements of the furnace, including the degree to which it is insulated. The rate of furnace cooling, with conventional design, is therefore at best relatively gradual for furnaces capable of high operating temperatures, particularly since economical operation of a high temperature furnace requires extensive use of insulation which, by definition, maintains heat within the furnace and therefore inherently limits the furnace cooling rate.

Another method of cooling, more rapid than the one described above, utilizes in addition to set point control a forced draft of cooling air directed at the furnace. According to this method, the set point is usually programmed to provide only enough heat to maintain a constant rate of temperature decrease within the furnace, thereby preventing overcooling or the occurrence of local cold spots within the furnace. While this method is more rapid than the one using the natural cooling rate of the furnace, it is still subject to severe limitations, especially from the point of view of uniform temperature control. The large thermal mass of the typical well insulated, high temperature furnace renders it almost impossible to attain the desired rapid furnace cooling rate without using powerful drafts of cooling air. On the other hand, if forceful cooling is used in order to improve the furnace cooling rate, an uneven temperature profile will often result. For example, if the interior of the furnace can be reached only through end ports, cooling air introduced through one end port will be heated up by the time it emerges from the other end so that the product within the furnace and between its end ports will not be cooled uniformly over its surface length.

It is therefore an object of the invention to provide a furnace which is capable of being heated to a temperature greatly above the product working temperature so that a product placed therein may be brought to the working temperature in a relatively short period of time, and which is also capable of being cooled rapidly so that the product being heated will not overshoot the prescheduled working temperature.

Another object of the invention is to provide a furnace wherein a product heated therein may be cooled rapidly and uniformly across its surface length.

Another object is to provide a furnace wherein surface areas of a product heated therein may be cooled simultaneously at different rates.

Broadly speaking, in accordance with the principles of the invention, a furnace is provided in which the effective insulation can be increased or decreased in a controlled manner. The insulation of the furnace of this invention is formed of a plurality of sections, each section being arranged to be moved relative to the product being heated or cooled. It is the specific purpose of insulation to prevent heat loss and hence movement of an insulation section away from an area of the product, which reduces the effective insulation of the furnace at that point, permits the product area to cool much more rapidly. Under these circumstances, the furnace can be heated to a temperature well above the desired product temperature and as the product approaches the desired temperature, the furnace may be rapidly and evenly cooled to reach the same equilibrium temperature.

The construction, operation and advantages of the invention will be readily apparent from the following description taken in conjunction with the accompanying drawing wherein:

FIG. 3 is a perspective view of a furnace, constructed in accordance with the principles of this invention, with the movable insulation sections in closed position for heating, and with portions of the forward insulation section and heater support being cut away to reveal the interior parts of the furnace;

FIG. 4 is a cross-sectional view of the novel furnace taken along plane 4—4 of FIG. 3, with the insulation sections in closed position for heating; and FIG. 5 is a cross-sectional view of the novel furnace similar to that of FIG. 4, but with the insulation sections in retracted position for cooling.

Figure 1:
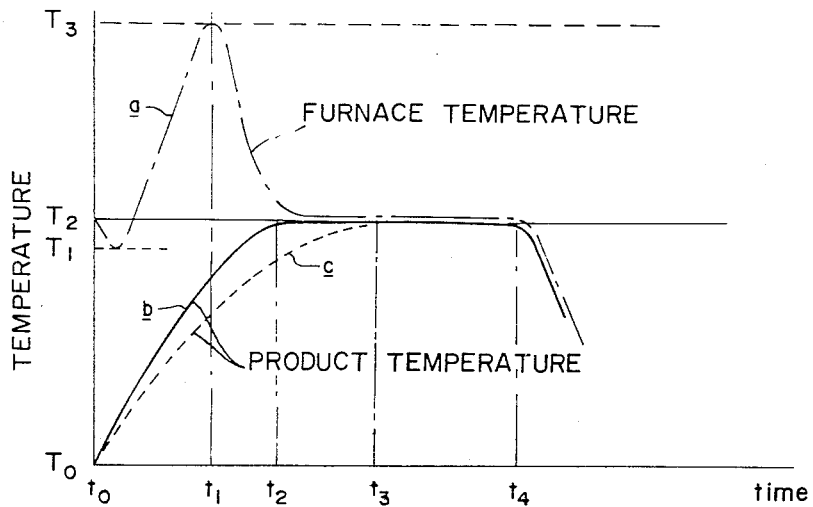
FIG. 1 is a graphical illustration of time-temperature curves for a furnace constructed according to the invention and of the temperature variation of a product placed therein.

With reference now to FIG. 1, curve $c$ illustrates the time-temperature characteristics of a product introduced at time $t_0$ at ambient temperature $T_0$, into a conventional furnace having a temperature $T_2$. The workpiece temperature asymptotically approaches the furnace temperature, reaching $T_2$ after considerable time at $t_3$.

A more desirable temperature characteristic for the work is illustrated in curve $b$. In this case, the product is introduced at time $t_0$ at a temperature $T_0$, and heated much more rapidly to soak temperature $T_2$ by time $t_2$. In order to accomplish this characteristic the furnace temperature must follow the program profile shown in curve $a$. The furnace temperature at $t_0$ is $T_2$ and, upon insertion of the "cold" workpiece, this temperature drops, somewhat to temperature $T_1$. In order to maximize the heating rate of the product, a large temperature differential is produced by heating the furnace to relatively high temperature $T_3$ reached at time $t_1$. In order to prevent product overheating, the furnace temperature must now be rapidly lowered to temperature $T_2$ at time $t_2$. The precise temperature and time periods will, of course, vary with the process and product material and size.

Sufficiently rapid cooling for many processes has not been realized with conventional furnaces. The variable effective insulation furnace of this invention will however cool sufficiently fast so that a furnace temperature profile as shown by curve $a$ in FIG. 1 may be produced.

With reference now to FIG. 3, the furnace of the invention is seen to include a cylindrical muffle 10 formed of a refractory material and open at both ends 12a and 12b for receiving the product or products to be heated. An electrical heating coil 16 is wound in a helical pattern along the central portion of the muffle, hereafter called the effective heating length of the muffle. A tubular heater support 24 is mounted outside of and concentric with the muffle 10. This heater support 24 extends axially along at least the effective heating length of the muffle. The heater support 24 and muffle 10 are maintained in fixed concentric and spaced relation by a series of axially extending refractory spacer rods 28. Each of the spacer rods 28 has a generally keyhole shaped cross section, as illustrated in FIG. 4, and includes a series of transverse slots (visible in FIG. 3) along its inner edge for spacing and retaining the helical heater coil 16. Each of the spacers 28 are formed identically but are positioned in an axially staggered manner so that the slots in each of the spacers are in different transverse planes of the cylindrical assembly thereby permitting the heater coil to be wound in a helix through them. The wall of the heater support 24 is axially slotted with keyhole shaped slots 24 to retain the enlarged beaded edge 32 of the respective spacer rod 28. The entire cylindrical assembly including the muffle 10 and the heater support 24 is supported at the ends by stationary insulated support blocks 14a and 14b. A series of conventional temperature sensing thermocouples (such as the one having a sensing junction at 36) may be located at various points along the effective length of the muffle 10 in the region between the muffle and the heater support 24. The thermocouple leads are omitted to simplify the drawing.

The muffle and heater support are both preferably composed of refractory material of low heat capacity. The muffle may, for example, be formed of quartz, mullite or silicon carbide while the heater support may be a ceramic core. In view of the small quantity of material used in the muffle and heater support, and in view of their low heat capacities, they have a relatively small thermal mass and provide relatively little insulation for the furnace interior. Accordingly, as that portion of the furnace so far described (except for the insulated support blocks) has relatively little insulation or insulative properties, it may be both easily and rapidly heated and cooled. However, as mentioned above, in order for a high temperature furnace to be capable of economical operation, massive insulation must be provided to prevent loss of heat from the furnace into the surrounding environment during the operation of the furnace. This insulation is provided in the furnace of the present invention by a pair of laterally movable insulation sections 38a and 38b positioned closely about the outer circumference of the heater support 24 to prevent heat loss from the muffle and core of the furnace. These insulation sections 38a and 38b as well as the insulating blocks 14a and 14b which support the muffle 10, may be formed of conventional insulative refractory materials, typically alumina. In FIG. 3, the insulation section 38a is shown partially cut away to expose the details of construction of the muffle 10, heating coil 16 and spacers 28. Certain structural features are omitted, for example, the entire furnace may be enclosed in a suitable steel case.

The insulating sections 38a and 38b are laterally movable to separate them mechanically from about the effective heating length of the muffle 10 thereby providing for rapid cooling of this muffle by both radiation and convection. The mechanism for moving the insulation sections may take any of several forms, however a convenient mechanism is illustrated in FIGS. 4 and 5. Thus referring to FIG. 4, a motor 40, responsive to a controller unit which will be described below, is arranged to drive a worm 42 formed with left and right handed externally threaded end portions 42a and 42b. A pair of lugs 46a and 46b are attached to and support insulation sections 38a and 38b, respectively, these lugs being formed with appropriate internally threaded bores 44a and 44b. Threaded end 42a engages threaded bore 44a while the other end 42b of the worm engages threaded bore 44b. Worm rotation in one direction will accordingly move the lugs 46a and 46b and attached insulation sections. In short, rotation of the motor 40 in one direction moves the insulation sections away from one another while rotation in the opposite direction moves them toward one another. The movement of the insulation sections 38a and 38b away from one another reduces the effective insulation of the furnace while movement towards one another increases the effective insulation. In FIG. 5, the insulation sections are shown in their retracted or least effective position.

While the cooling rate of the heater support, muffle and enclosed product will be greatly increased by retraction of the insulation section and exposure of the effective heating length of the low thermal mass furnace interior to ambient conditions, the cooling rate may be further increased by control of these ambient conditions. Thus cooling air may be blown onto the exposed heater support 24 by means of blowers 48a, 48b, and 48c and their respective communicating manifold sections 50a, 50b, and 50c to increase the convection cooling. While uniform cooling is generally desired along the effective heating length of the muffle, it may be desired to separately control the end blowers 48a and 48c to compensate for the lower heat loss at the muffle ends due to the insulating end blocks 14a and 14b. Other patterns of blower operation may be desired; for example, where preferential cooling of a product surface directly opposite a particular manifold is desired, the corresponding blower may be operated at an increased rate.

Figure 2:
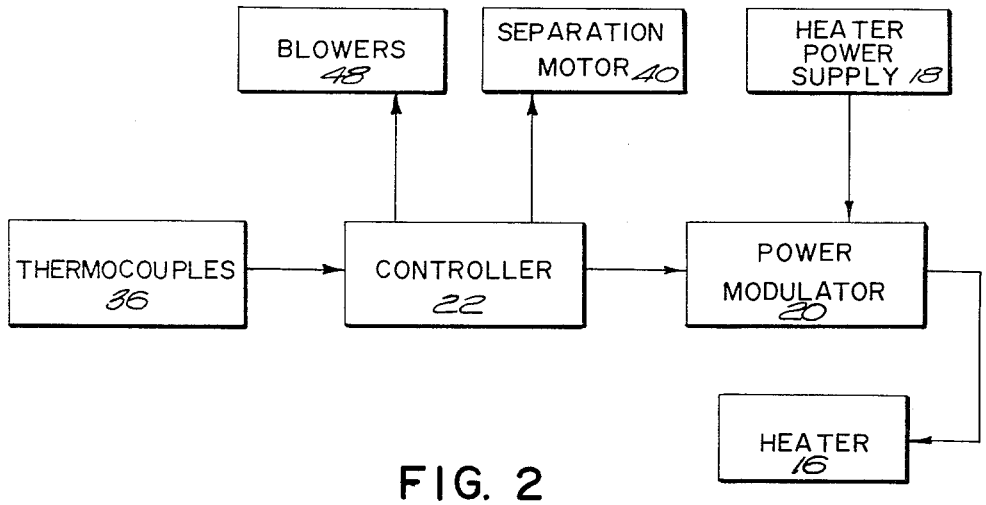
FIG. 2 is a block diagram showing the interrelationship of the various control elements of the novel furnace.

Referring now to FIG. 2 there is shown, in block diagram form, a furnace control system for governing the operation in accordance with the principles of the invention. Thermocouples 36 are connected to provide input information into a controller 22 which in turn controls the blowers 48, the separation motor 40 and a power modulator 20 which in turn controls the power supplied to the heater 16 from heater power supply 18. The thermocouples 36 in the furnace interior are preferably located opposite each blower manifold 50 in order to provide the controller 22 continuously with separate indications of the interior furnace temperature in each of the respective regions. Thus the controller may be a conventional electrical system programmed to respond to certain temperature limits in a particular time sequence to operate the separation motor and blowers for cooling and the power modulator 20 for applying heating power to the heating element 16. With appropriate timing the controller 22 may be programmed to produce the rising slops of the furnace temperature curve $a$ (shown in FIG. 1) by increasing the energy to the heater 16 upon insertion of the product. The controller 22 may also produce the falling slope of the furnace temperature curve by operation, at a temperature just below $T_3$, to interrupt the flow of power to the heater 16 and initiate operation of separation motor 40 to produce cooling and additionally to operate the blowers 48 if necessary to accelerate this cooling; and also to provide the sharp furnace temperature drop shown at time $t_4$ in curve $a$ of FIG. 1 at the end of the cycle.

The novel furnace described hereinabove possesses a particular economic advantage over conventional furnaces. Thus in operation at the furnace shown in the drawings, such as at time $t_4$, a sharp reduction in product temperature is obtained by separating the insulating sections and causing a blast of air to cool the central core. If after completion of the cooling cycle the product is withdrawn from the furnace and the insulating sections closed to reheat the furnace to the normal operating temperature, a considerable amount of heat energy will still remain in the insulating sections. In effect then the time for reheating will be substantially reduced over a conventional furnace where both the core and the surrounding insulation have to be brought down to the lower temperature before the product is withdrawn.

While a specific physical arrangement of the furnace and separable insulating jackets has been described, it is apparent that a number of other movable insulation configurations may be employed. For example, the single pair of retractable sections shown may in turn be split into a series of separate pairs of retractable insulative elements, operated by individual motor drives. While not shown specifically, a three zone system has been indicated by the zone markings $Z_1$, $Z_2$, and $Z_3$.

Having described the invention, various modifications and improvements may now become apparent to those skilled in the art and the invention described herein should be construed as limited only by the spirit and scope of the appended claims.

What is claimed is:

1. A furnace for rapidly heating a product placed therein to a soak temperature comprising:
   a fixed refractory chamber having an interior adapted to contain the product;
   insulating material at least partially enclosing said chamber, at least a portion of said insulating material about said chamber being in the form of a plurality of retractable sections;
   means for rapidly heating said chamber interior to a temperature substantially in excess of said soak temperature while said sections are in a position relatively close to said chamber; and
   means for retracting said sections to a position spaced from said fixed chamber when the product approaches said soak temperature to allow rapid cooling of said chamber interior to said soak temperature at substantially the same time as the product reaches said soak temperature.

2. The furnace recited in claim 1 further including means responsive to the temperature drop occurring within said chamber upon insertion of a relatively cold product therein, to activate said heating means.

3. The furnace recited in claim 1 further including means responsive to the attainment of a predetermined temperature in said chamber interior for activating said retracting means.

4. The furnace recited in claim 1 wherein at least a pair of said retractable sections are adapted to be in physical contact with one another above said chamber when said sections are in a position relatively close to said chamber and to separate during retraction.

5. The furnace recited in claim 1 further including cooling means for forcing a flow of relatively cool fluid past said chamber when said sections are in the retracted position.

6. The furnace of claim 1 further including:
   cooling means for forcing a flow of relatively cool fluid about the exterior of said chamber;
   closure means for moving said sections into a position relatively close to said chamber; and
   control means to coordinate actuation of one or more of said heating means, said cooling means, said retracting means and said closure means to maintain the product substantially at soak temperature for a predetermined period of time.

7. A furnace comprising:
   a fixed refractory element having a chamber adapted to contain a product to be heated;
   heating means adapted to heat said product within said chamber;
   insulating material at least partially enclosing said element, at least a portion of said insulating material being in the form of a plurality of movable sections; and
   means for selectively moving at least one of said sections toward and away from said element.

8. The furnace recited in claim 7 further comprising means for selectively forcing a flow of cooling fluid past said element when said sections are in a predetermined position relative to said element.

9. The furnace recited in claim 8 further having control means to coordinate activation of said moving means, said heating means and said cooling means to achieve a predetermined temperature pattern within said element.

References Cited

UNITED STATES PATENTS

| | | | |
|---|---|---|---|
| 2,517,869 | 8/1950 | Grapp | 263—40 |
| 2,589,495 | 3/1952 | Hess et al. | 263—4 |
| 3,020,032 | 2/1962 | Casey | 263—42 |

JOHN J. CAMBY, *Acting Primary Examiner.*